(12) United States Patent
Diminnie et al.

(10) Patent No.: US 6,669,837 B1
(45) Date of Patent: Dec. 30, 2003

(54) ALKALI METAL HYDROXIDE EVAPORATOR SYSTEM

(75) Inventors: Jonathan B. Diminnie, Georgetown, TN (US); Sanders H. Moore, Ooltewah, TN (US); James F. Pickering, Cleveland, TN (US); Thomas E. Corvin, Riceland, TN (US)

(73) Assignee: Sunbelt Chlor Alkali Partnership, McIntosh, AL (US)

( * ) Notice: Subject to any disclaimer, the term of this patent is extended or adjusted under 35 U.S.C. 154(b) by 0 days.

(21) Appl. No.: 10/322,295

(22) Filed: Dec. 17, 2002

(51) Int. Cl.⁷ ................................................ C23F 13/00
(52) U.S. Cl. ...................... 205/740; 205/738; 205/730; 204/196.37; 204/196.38
(58) Field of Search .................. 204/196.37, 196.38; 205/740, 738, 730

(56) References Cited

U.S. PATENT DOCUMENTS

| 3,244,605 A | | 4/1966 | Hotchkiss et al. ........... 204/153 |
|---|---|---|---|
| 3,664,885 A | | 5/1972 | Orlova et al. .............. 148/6.14 |
| 3,784,456 A | | 1/1974 | Otto ............................ 204/153 |
| 3,954,948 A | * | 5/1976 | Sakowski .................... 423/474 |
| 4,110,181 A | * | 8/1978 | Sluse et al. .................. 205/735 |
| 4,196,184 A | * | 4/1980 | Sakowski .................... 423/639 |
| 4,585,579 A | | 4/1986 | Bommaraju et al. ......... 252/387 |
| 4,847,062 A | * | 7/1989 | Rogers et al. ............... 423/379 |
| 5,824,283 A | * | 10/1998 | Babjak et al. ......... 423/594.19 |
| 5,961,837 A | * | 10/1999 | Ferrara et al. ............... 210/696 |
| 6,080,299 A | * | 6/2000 | Hegeman et al. ........... 205/516 |
| 6,174,386 B1 | * | 1/2001 | Delblanc-Bauer et al. .. 148/325 |
| 6,200,455 B1 | | 3/2001 | Hegeman et al. ........... 205/508 |

OTHER PUBLICATIONS

Gayer, Karl H., et al., *The Equilibria of Nickel Hydroxide, Ni(OH)₂, in Solutions of Hydrochloria Acid and Sodium Hydroxide at 25°*, Journal of the American Chemical Society, vol. LXXI, Sep.–Dec. 1949, pp. 2973–2975.

Deltombe, E., et al., *Nickel*, Atlas of Electrochemical Equilibria in Aqueous Systems, Chapter IV, Section 123, pp. 330–342, No month/year available.

\* cited by examiner

Primary Examiner—Bruce F. Bell
(74) Attorney, Agent, or Firm—Wiggin & Dana LLP; William A. Simons

(57) ABSTRACT

A process for reducing the corrosion of nickel metal in an alkali metal hydroxide evaporator equipment which comprises the step of impressing a total protection potential directly upon the nickel metal material in alkali metal hydroxide evaporator that is in contact with an aqueous alkali metal hydroxide solution during evaporation of that solution; said total potential being sufficient to reduce the amount of corrosion of the nickel metal to an oxide that may dissolve in the alkali metal hydroxide solution.

15 Claims, 1 Drawing Sheet

ALKALI METAL HYDROXIDE EVAPORATOR SYSTEM

BACKGROUND OF THE INVENTION

1. Field of the Invention

The present invention relates to a process and apparatus for protecting an alkali metal hydroxide evaporation system against corrosion. In particular, this invention relates to a process of, and apparatus for, impressing a sufficient total protection potential directly upon nickel metal evaporation apparatus during the alkali metal hydroxide evaporation process to cause the apparatus to maintain its state as nickel metal and not form an oxide which can dissolve in the circulating alkali metal hydroxide solution.

2. Brief Description of Art

Caustic soda (NaOH) is commercially manufactured by the electrolysis of brine in chlor-alkali mercury, diaphragm or membrane cells. The aqueous caustic soda product made from the membrane cells contains about 32–34% by weight NaOH, while the aqueous caustic soda product made from diaphragm cells contains about 12–15% by weight NaOH and the product from mercury cells is about 50% by weight NaOH. In order to increase the concentration of NaOH for shipment, the caustic soda products from diaphragm and membrane cells are further concentrated by passing them through evaporation apparatus (commonly referred to as NaOH evaporators). It is desirable to increase the NaOH concentration in these products to about 50% by weight NaOH. Caustic soda made from mercury cell normally does not require evaporation because it is already sufficiently concentrated.

Generally, a portion of these NaOH evaporators are made of nickel metal or nickel alloys. Because the evaporation process is conducted at elevated temperature conditions and with a considerable amount of fluid turbulence in the evaporator system, there is an observed corrosion rate of the nickel or nickel alloy evaporator surfaces and associated piping. This corrosion may result in the concentrated sodium hydroxide product after evaporation having significant amounts of dissolved nickel therein. This amount of corroded nickel in the concentrated product is generally at a concentration of about 0.3 to 0.5 ppm with nickel concentrations running much higher during process upsets and startups. While such contaminated NaOH meets the product specification for Ni of 0.5 ppm for use in many applications, it is undesirable for use in the manufacture of bottled sodium hypochlorite bleach without filtration, which requires a 50% NaOH solution containing no more than 0.3 ppm Ni. This more rigorous specification is required because the Ni impurity catalyzes the decomposition of sodium hypochlorite to sodium chloride and oxygen.

The origin of the nickel corrosion in the NaOH evaporator system is believed due to the oxidation of the nickel in the evaporator equipment to Ni(II) hydroxide by the aerated sodium hydroxide solution, followed by dissolution of a portion of the Ni(II) hydroxide film as illustrated according to the following chemical reactions:

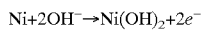
Ni+2OH⁻→Ni(OH)$_2$+2e⁻

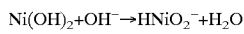
Ni(OH)$_2$+OH⁻→HNiO$_2$⁻+H$_2$O

In addition, direct oxidative dissolution of nickel metal may also occur as illustrated according to the following chemical reaction:

Ni+3OH⁻→NHiO$_2$⁻+H$_2$O+2e⁻

In order to reduce nickel contamination in these concentrated NaOH products, a number of alternative process improvements have been considered.

These attempts included the addition of a reducing agent to the NaOH evaporator feed. See U.S. Pat. No. 4,585,579 (Bommaraju et al.). Also, the use of magnetic means to remove metal impurities has been contemplated. See U.S. Pat. No. 6,200,455 (Hegeman et al.). And, the use of alternative materials of construction other than nickel metal in the evaporator apparatus has been suggested. See U.S. Pat. No. 3,664,885. And, further, the use of electrochemical cells to treat the resulting NaOH solution after evaporation concentration and thereby remove the metal impurities by reduction onto a suitable cathode in the electrochemical cell. See U.S. Pat. No. 3,784,456 (Otto) and U.S. Pat. No. 3,244,605 (Hotchkiss et al.). And still further, after the NaOH evaporation was completed additional filtration steps have been employed to remove impurities including a portion of these described nickel impurities before the NaOH is used at sodium hypochlorite (bleach) plants.

All of these prior attempts were unduly costly and involved extra processing steps or did not work sufficiently well. Accordingly, the present invention offers a solution to this problem without incurring the undesirable costs and/or additional processing steps required by these prior art attempts.

Similarly, potassium hydroxide solutions may require evaporation to bring their concentrations up to a suitable level for shipment. Thus, the same nickel corrosion problems during evaporation may occur and also require an answer.

BRIEF SUMMARY OF THE INVENTION

The present invention relates to a process for reducing the nickel corrosion of an alkali metal evaporator by the application of total protection potential to the exposed nickel surfaces in order to render the nickel passive to or immune from corrosion during the alkali metal hydroxide evaporation process. In such a process, electrically insulated anodes and cathodes would be inserted into the evaporator system. With a nickel anode and nickel cathode, the following processes would be involved, along with their associated electrode potentials:

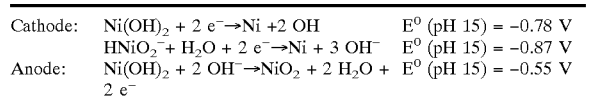

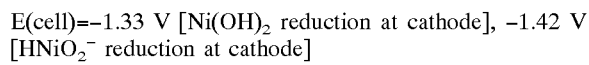

E(cell)=−1.33 V [Ni(OH)$_2$ reduction at cathode], −1.42 V [HNiO$_2$⁻ reduction at cathode]

This information may be found in Chapter IV, Section 12.3 of the Atlas of Electrochemical Equilibria M. Aqueous Systems by E. Deltombe, DeZouboo and M. Pourboix.

Therefore, one aspect of the present invention is directed to a process for reducing the corrosion of nickel material in alkali metal hydroxide evaporator equipment which comprises the step of impressing a total protection potential directly upon at least a portion of the nickel metal material in the alkali metal hydroxide evaporator that is in contact with an aqueous alkali metal hydroxide solution during evaporation of that solution; said total protection potential being sufficient to reduce the amount of corrosion of the nickel material to an oxide that may dissolve in the alkali metal hydroxide solution.

Another aspect of the present invention is directed to an alkali metal evaporator system that has reduced corrosion of nickel material present in alkali metal evaporator equipment wherein at least one set of an anode and a cathode are attached to the nickel-containing alkali metal hydroxide evaporator system to apply a total protection potential directly upon at least a portion of the nickel material in the alkali metal hydroxide evaporator that is in contact with an aqueous alkali metal hydroxide solution during evaporation of that solution, said total protection potential being sufficient to reduce the amount of corrosion of the nickel material to an oxide that may dissolve in the alkali metal hydroxide solution.

And another aspect of the present invention is directed to a preferred embodiment of this process wherein the total protection potential is maintained within a predetermined range to prevent the formation of hydrogen gas above a concentration of 4% by volume in the evaporator system.

Still another aspect of the present invention is directed to a preferred embodiment of this process wherein a purge gas stream is employed to the alkali metal hydroxide evaporator equipment to (1) prevent the formation of unacceptable hydrogen gas concentrations therein, and (2) allow for a higher total protection potential to be applied to the nickel metal to further reduce any corrosion from occurring.

DETAILED DESCRIPTION OF THE INVENTION

Figure 1:
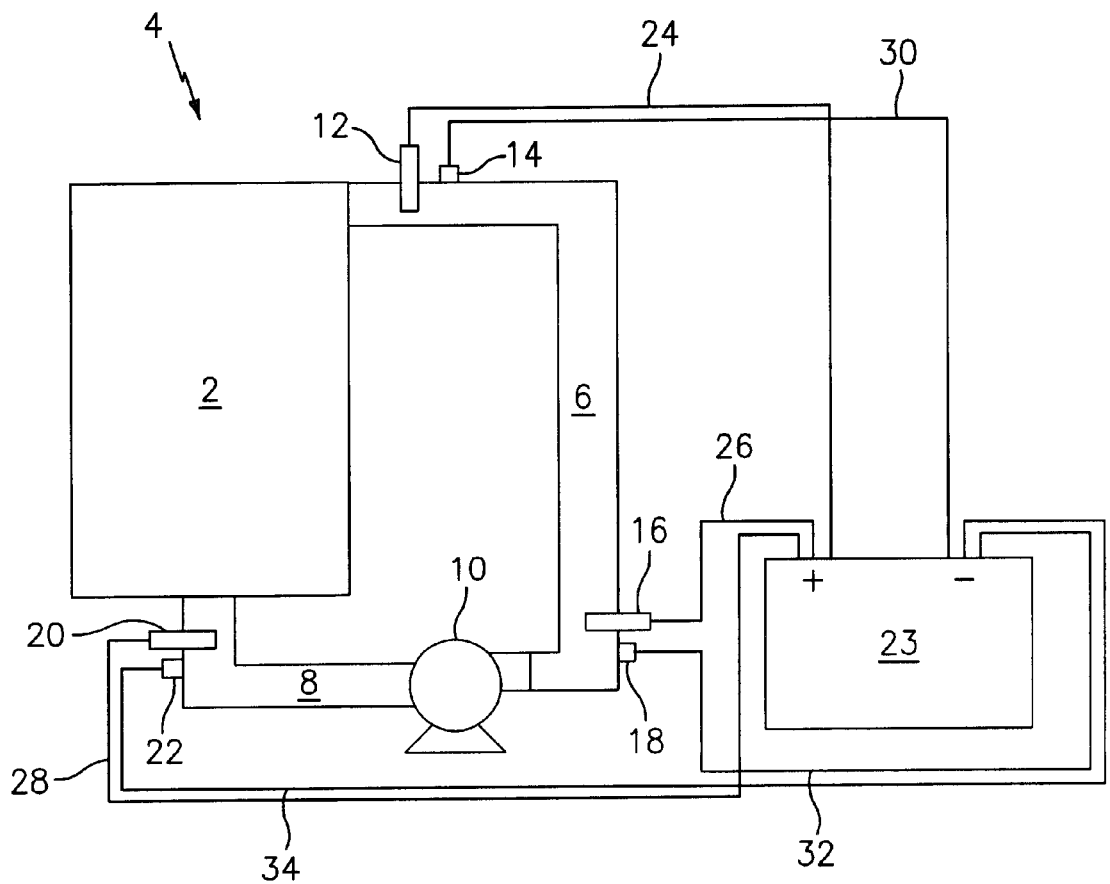
FIG. 1 is directed to a schematic drawing of one embodiment of the present inventions.

The terms "alkali metal" and "alkali metal hydroxide" as used in the present specification and claims are intended to mean any alkali metal cation and, particularly, sodium and potassium.

The terms "nickel metal evaporation equipment" and "nickel metal evaporation apparatus" as used in the present specification and claims refer to the evaporation itself and any associated piping which is made of nickel metal or a nickel alloy.

The cathodic protection offered by the present invention is a separate operation from the alkali metal hydroxide concentration by evaporation that occurs simultaneously in the evaporation system.

The alkali metal hydroxide evaporation equipment that is subject to the present invention includes any type of evaporation equipment that is made of nickel metal or a nickel alloy and that nickel metal on nickel alloy comes into contact with the alkali metal hydroxide solution during the evaporation. Thus, any standard nickel-containing evaporation equipment such as falling film evaporators commonly used as alkali metal hydroxide evaporators may be used in the present process and apparatus. Alternatively, forced circulation evaporators are other suitable examples.

With respect to a conventional three-effect falling film evaporator commonly used as a NaOH evaporator, it has been found that corrosion particularly occurs on the first effect piping associated with that evaporator. In a three-effect evaporator, the hottest temperatures and highest pressures are in the first effect (i.e., generally about 150° C. to 160° C. and about 20 to 30 psig). The second effect (i.e., generally about 105° C. to 115° C. and about 3 to 5 psig) and third effect (i.e., about 60° C. to 64° C. and about 0.86 to 0.95 psig) generally operate at lower temperatures and pressures. Thus, the hotter operating temperatures and more turbulence in the first effect piping causes greatest corrosion in that piping. Generally, it has been found that nickel corrosion occurs anywhere in evaporator equipment where the temperatures are above about 130° C.

One embodiment of the present invention is illustrated by FIG. 1. A first effect heater 2 in a three-effect falling film NaOH evaporator system 4 has nickel metal (Ni200) recirculation pipes 6 and 8 connected to a recirculation pump 10. The recirculation pipes 6 and 8 recycle the NaOH solution through this first effect evaporator circulation loop 2 during the evaporation process. According to this embodiment of the present invention, three pairs of electrically isolated nickel anodes and nickel cathode lugs are attached to the nickel recirculation pipes 6 and 8. The nickel anodes and nickel cathode in each pair are located about one to four feet apart on the recirculation pipe. They should be close enough to draw a sufficient current (and create a cathodic protection potential) across the distance they are separated. These provide the cathodic protection potential to these nickel recirculation pipes. The upper pair of anode 12 and cathode lug 14 are attached to the nickel recirculation pipe 6 close to where it is attached to the first effect evaporator circulation loop 2. The middle pair of anode 16 and cathode lug 18 are attached to nickel recirculation pipe 6 close to recirculation pump 10. The third set of anode 20 and cathode lug 22 are attached to recirculation pipe 8. The anodes 12, 16 and 20 may be made from any suitable anode material for applying an electrical potential to nickel evaporator equipment. The preferred anode material is nickel metal Ni200, which is widely available. The cathodes 14, 18 and 22 may be made of any suitable cathode material for applying an electrical potential to nickel evaporator equipment. The preferred cathode material is also Ni200, which is the same material as the evaporator piping.

Generally, the total protection potential applied to the evaporator equipment may be any voltage that prevents the oxidation of the nickel to dissolvable nickel oxides. Preferably, the voltage should be maintained at a minimum protecting voltage to cause this desirable corrosion-preventing effect, but should also be not so great so as to cause the undesirable formation of hydrogen gas in the evaporation system. While this preferred voltage will depend upon the particular type of evaporation equipment involved, total dc voltages in the range of about 1.75 to 2.5 Volts have been found particularly suitable.

In another embodiment, it may be desirable to include a inert gas circulation system in the NaOH evaporator system to dilute any hydrogen gas that may be formed. This inert gas system may be used instead of or with controlled voltage to prevent the formation of the explosive hydrogen gas in the NaOH evaporator system. The preferred inert gases are either air or nitrogen.

While the above preferred embodiment describes an evaporation system with caustic soda, similar systems may be used with the evaporation systems of other aqueous alkali metal hydroxide solutions such as potassium hydroxide.

The present invention is further described in detail by means of the following Examples and Comparisons. All parts and percentages are by weight, all voltages are dc and all temperatures are degrees Celsius unless explicitly stated otherwise.

EXAMPLE 1

Initial Laboratory Testing

A series of four preliminary laboratory experiments were conducted using the following setup.

Two pieces of 0.63 mm diameter nickel wire, each weighing 8–9 grams, were wound into electrodes and placed in a 600 mL Teflon beaker. A second 600 mL Teflon beaker had a single 16–17 gram piece of wound nickel wire placed in it as a control. 400 mL of an aqueous caustic soda solution (catholyte) containing about 30–33% by weight NaOH from a membrane cell chlor/alkali plant was then placed in both beakers, and a potential of 1.6 V was applied across the 2 nickel electrodes in the first beaker. Within 1 minute the anode in the front beaker was found to be coated with a black film of $NiO_2$ and the cathode had taken on a shiny metallic appearance, and the evolution of small amounts of oxygen and hydrogen were observed. The beakers were then placed on a hot plate and heated until the NaOH solutions commenced boiling (at about a temperature of 110° C.). The 1.6 V dc electrical potential was maintained during this evaporation. The solutions were allowed to remain at a boil until analysis of aliquots for NaOH strength showed the solutions to be approximately 50 wt %, with the exception of Experiment 1, in which the final strength was approximately 38 wt %. The nickel wire pieces were then removed from the beakers and solutions allowed to cool. Total heating time was 0.5–3 hours. After cooling, the solutions were analyzed for NaOH strength and Ni concentration by ICP-ES. The analytical data from the experiments are summarized in the Table 1 below.

TABLE 1

| Experiment Number | Sample | Wt % NaOH | ppm Ni (ICP-ES) |
|---|---|---|---|
| 1 | Catholyte | 32.59 | <0.100 |
| 1 | Control | 37.54 | 0.154 |
| 1 | 1.6 V applied | 38.93 | 0.102 |
| 2 | Catholyte | 32.33 | <0.100 |
| 2 | Control | 48.43 | 0.794 |
| 2 | 1.6 V applied | 49.03 | 0.180 |
| 3 | Catholyte | 32.57 | <0.100 |
| 3 | Control | 54.15 | 1.51 |
| 3 | 1.6 V applied | 51.43 | <0.100 |
| 4 | Catholyte | 30.98 | <0.100 |
| 4 | Control | 48.70 | 0.602 |
| 4 | 1.6 V applied | 48.71 | <0.100 |

During experiments 3 and 4, the electrodes were also weighed before and after the experiment; essentially no change in the electrode weight was observed, as shown in Table 2 below.

TABLE 2

| Experiment Number | Nickel Piece | Weight Before (g) | Weight After (g) |
|---|---|---|---|
| 3 | Control | 17.249 | 17.248 |
| 3 | Anode | 8.942 | 8.943 |
| 3 | Cathode | 8.554 | 8.553 |
| 4 | Control | 17.248 | 17.250 |
| 4 | Control | 8.943 | 8.943 |
| 4 | Cathode | 8.559 | 8.555 |

These experiments generally show that at about applied 1.6 V potential the amount of nickel corrosion occurred at much lower rate than with the control that had no applied potential.

EXAMPLE 2

Installation of Electrical Protection System at a Commercial Membrane Chlor/Alkali Plant A test design was installed on a three-effect falling film NaOH evaporator system located at a commercial membrane chlor/alkali plant. The test design was placed on the recirculation pipes attached to the first effect recirculation loop in this falling film evaporator system. FIG. 1 shows the approximate locations of the three respective pairs of anode and cathode connections located within these recirculation pipes.

The test design consisted of a 0–12 V dc, 750 A air cooled rectifier to provide power, and three sets of cathode/anode located within the recirculation pipe set at 2.05 V with the appropriate amperage. Voltages and currents on the three pairs of cathode connections/anodes were monitored during the period of the test (approximately 40 days). NaOH solution samples were obtained across the evaporator system and analyzed for nickel content, with particular emphasis on the nickel concentration in the NaOH exiting the first effect and the nickel concentration in the 50% NaOH solution going to storage.

The initial application of a potential on the recirculation pipes of the first effect evaporator resulted in a fairly steady decrease in the nickel concentrations of the 50% NaOH leaving the evaporator from 0.40 ppm to 0.25 ppm. After day one, there was a mechanical failure of the evaporator, causing it to be shut down, and the rectifier was turned off for about six days. The nickel concentration increased to around 0.32 ppm. The rectifier was turned back on the seventh day of the test period, and the voltage on the top cathode/anode connection was increased from 1.97 to 2.07 V, and the nickel concentration reduced further to about <0.20 ppm. Unfortunately, analysis of the gas exiting the evaporator stack vent showed a high (>4%) concentration of hydrogen, which necessitated a reduction in the voltage to 1.85 V on days 9 to 13, and the nickel concentration increased to between 0.20 and 0.30 ppm, with the moving average at about 0.25 ppm. The addition of a purge gas to the system to dilute the hydrogen in the evaporator stack vent allowed for the voltage to be increased to 2.10 V on the $15^{th}$ day and the nickel concentrations reduced further to between 0.20 and 0.25 ppm.

To test whether the decrease in nickel concentration observed was truly coming as a result of electrical protection, the rectifier was turned off on the $22^{nd}$ day and left off until the $27^{th}$ day. During this time there was a dramatic and rapid increase in the nickel concentration to 0.30–0.40 ppm. When the rectifier was turned back on (with a voltage across the top cathode connection/anode of 2.19 V), the nickel concentration again rapidly decreased and remained fairly constant at 0.20 ppm for the remainder of the test period. This test clearly demonstrated that the applied potential on the recirculation pipe of the $1^{st}$ effect evaporator was responsible for a reducing the nickel concentration in the 50% NaOH leaving the evaporator from 0.30–0.40 to 0.20 ppm.

Voltages and currents on the three anode/cathode pairs were monitored periodically during the test period and are shown in Table 3.

TABLE 3

| Day | Top Anode Voltage | Top Anode Amperage | Middle Anode Voltage | Middle Anode Amperage | Bottom Anode Voltage | Bottom Anode Amperage |
|---|---|---|---|---|---|---|
| 1 | 2.066 | NM | 2.162 | NM | 2.213 | NM |
| 1 | 2.057 | NM | 2.153 | NM | 2.204 | NM |
| 1 | 2.055 | NM | 2.147 | NM | 2.199 | NM |
| 2 | 2.020 | 76 | 2.118 | 111 | 2.180 | 120 |
| 2 | 2.029 | 78 | 2.067 | 112 | 2.168 | 121 |
| 2* | 1.942 | 85 | 2.078 | 119 | 2.117 | 130 |
| 7* | 1.922 | 62.00 | 2.078 | 89.0 | 2.114 | 90.5 |

TABLE 3-continued

| Day | Top Anode Voltage | Top Anode Amperage | Middle Anode Voltage | Middle Anode Amperage | Bottom Anode Voltage | Bottom Anode Amperage |
|---|---|---|---|---|---|---|
| 7 | 1.985 | 63.20 | 2.066 | 89.4 | 2.101 | 91.2 |
| 8 | 1.970 | 67.20 | 2.046 | 95.2 | 2.072 | 98.3 |
| 8 | 2.067 | 88.8 | 2.199 | 127.7 | 2.243 | 135.50 |
| 13 | 1.862 | 66.40 | 1.946 | 95.1 | 2.004 | 99.8 |
| 14 | 1.850 | 70.2 | 1.937 | 98.0 | 1.998 | 103.20 |
| 15 | 1.857 | 66.2 | 1.938 | 94.8 | 2.002 | 99.60 |
| 15 | 2.101 | 113.6 | 2.259 | 162.4 | 2.234 | 170.6 |
| 15 | 2.093 | 110.0 | 2.238 | 157.1 | 2.317 | 164.90 |
| 15 | 2.118 | 108.9 | 2.269 | 155.0 | 2.351 | 163.00 |
| 20 | 2.098 | 111.0 | 2.250 | 155.0 | 2.329 | 170.0 |
| 27** | 2.188 | 105.7 | 2.360 | 152.2 | 2.430 | 157.0 |
| 27** | 2.174 | 99.3 | 2.377 | 145.5 | 2.436 | 145.1 |
| 28 | 2.195 | 103.1 | 2.328 | 152.6 | 2.380 | 1534. |
| 28 | 2.164 | 101.2 | 2.292 | 150.8 | 2.363 | 166.7 |
| 29 | 2.191 | 108.0 | 2.330 | 157.2 | 2.375 | 157.6 |
| 29 | 2.177 | 105.4 | 2.313 | 155.4 | 2.359 | 157.3 |
| 34 | 2.138 | 111.2 | 2.280 | 161.7 | 2.322 | 160.7 |
| 34 | 2.120 | 107.9 | 2.261 | 157.1 | 2.307 | 156.7 |
| 35 | 2.138 | 114.7 | 2.280 | 165.2 | 2.324 | 161.0 |
| 35 | 2.119 | 110.2 | 2.262 | 160.2 | 2.306 | 159.3 |

NM = Not measured
*Rectifier turned off from afternoon of day 2 until morning of day seven due to evaporator shutdown and elevated hydrogen at evaporator stack vent
**Rectifier turned off from morning of day 22 until morning of day 27 to evaluate effect of no electrical protection on nickel concentration in the NaOH These experiments showed that the application of a potential to nickel metal immersed in NaOH during the evaporation of the NaOH solution resulted in a significant decrease in the nickel concentration of the final product solution. The resulting product 50% NaOH solution from this plant scale trial was found to have a nickel concentration of 0.20 ppm, which would be suitable for use in the manufacture of sodium hypochlorite bleach.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for reducing the corrosion of nickel in alkali metal hydroxide evaporator equipment which comprises the step of impressing a total protection potential directly upon at least a portion of the nickel material in alkali metal hydroxide evaporator that is in contact with an aqueous alkali metal hydroxide solution during evaporation of that solution; said total protection potential being sufficient to reduce the amount of corrosion of nickel to a nickel oxide that may dissolve in the alkali metal hydroxide solution.

2. The process of claim 1 wherein the nickel material is nickel metal.

3. The process of claim 1 wherein the nickel material is a nickel alloy.

4. The process of claim 1 wherein the total protection potential is about 1.75 to about 2.5 Volts dc created between each anode/cathode set within the evaporator equipment.

5. The process of claim 1 wherein the total protection potential is further controlled to prevent the formation of hydrogen gas in the NaOH evaporator system above a concentration of 4% by volume in the evaporator system.

6. The process of claim 5 wherein an inert gas stream is circulated in the NaOH evaporator to dilute at least a portion of any hydrogen gas formed therein.

7. The process of claim 1 wherein an inert gas stream is circulated in the NaOH evaporator to dilute at least a portion of any hydrogen gas formed therein.

8. The process of claim 1 wherein the alkali metal hydroxide is sodium hydroxide.

9. The process of claim 1 wherein the alkali metal hydroxide is potassium hydroxide.

10. An alkali metal hydroxide evaporator system that has reduced corrosion of nickel material present in alkali metal hydroxide evaporator equipment wherein at least one set of an anode and a cathode are attached to the nickel-containing alkali metal hydroxide evaporator system to apply a total protection potential directly upon at least a portion of the nickel material in the alkali metal hydroxide evaporator that is in contact with an aqueous alkali metal hydroxide solution during evaporation of that solution, said potential being sufficient to reduce the amount of corrosion of the nickel material to an oxide that may dissolve in the alkali metal hydroxide solution.

11. The evaporator system of claim 10 wherein the evaporator system is a falling film-type evaporator system.

12. The evaporator system of claim 10 wherein an inert gas circulation system is located in the evaporator system to dilute at least a portion of any hydrogen gas formed in the evaporator system.

13. The evaporator system of claim 10 wherein the at least one set of an anode and a cathode are attached to the piping of the first effect of a three-effect falling film-type evaporator system.

14. The evaporation system of claim 10 wherein at least one set of an anode and a cathode are attached to the piping of the second effect of a three-effect falling film-type evaporator system.

15. The evaporation system of claim 10 wherein the evaporation system is a forced circulation-type evaporator system.

* * * * *